US012768529B2

(12) United States Patent
Guo et al.

(10) Patent No.: US 12,768,529 B2
(45) Date of Patent: Oct. 20, 2026

(54) WATERPROOF LAMP

(71) Applicant: Guangzhou Rising Dragon Recreation Industrial Co., Ltd., Guangzhou (CN)

(72) Inventors: Ziqin Guo, Guangzhou (CN); Huamin Tang, Guangzhou (CN)

(73) Assignee: GUANGZHOU RISING DRAGON RECREATION INDUSTRIAL CO., LTD., Guangzhou (CN)

( * ) Notice: Subject to any disclaimer, the term of this patent is extended or adjusted under 35 U.S.C. 154(b) by 90 days.

(21) Appl. No.: 18/896,964

(22) Filed: Sep. 26, 2024

(65) Prior Publication Data

US 2026/0002664 A1 Jan. 1, 2026

(30) Foreign Application Priority Data

Jun. 28, 2024 (CN) ........................ 202421526660.9

(51) Int. Cl.

| | |
|---|---|
| ***F21V 31/00*** | (2006.01) |
| ***F21V 19/00*** | (2006.01) |
| ***F21V 23/00*** | (2015.01) |
| ***F21V 23/06*** | (2006.01) |
| ***F21Y 113/00*** | (2016.01) |

(52) U.S. Cl.

CPC .......... *F21V 31/005* (2013.01); *F21V 19/003* (2013.01); *F21V 23/002* (2013.01); *F21V 23/06* (2013.01); *F21Y 2113/00* (2013.01)

(58) Field of Classification Search

CPC .................................................... F21V 31/005

See application file for complete search history.

(56) References Cited

U.S. PATENT DOCUMENTS

| | | | | |
|---|---|---|---|---|
| 7,883,261 | B2 * | 2/2011 | Yu | F21V 31/005<br>362/249.02 |
| 9,719,672 | B1 * | 8/2017 | Moghal | F21V 31/005 |
| 2023/0160567 | A1 * | 5/2023 | Zhang | F21V 15/01<br>362/296.01 |
| 2023/0246380 | A1 * | 8/2023 | Wang | F21S 4/10<br>362/217.13 |
| 2023/0324037 | A1 * | 10/2023 | Zhang | F21V 19/04<br>362/296.01 |
| 2024/0240782 | A1 * | 7/2024 | Zhu | F21V 31/005 |

* cited by examiner

*Primary Examiner* — Eric T Eide

(74) *Attorney, Agent, or Firm* — Frank Niranjan

(57) ABSTRACT

A waterproof lamp includes a lamp body, a wire inlet base arranged at a bottom of the lamp body, and an electrical wire. A PCB and a lamp panel electrically connected to the PCB are arranged in the lamp body, a male terminal is arranged on the PCB, a female terminal is correspondingly arranged at an end of the electrical wire, and the female terminal is configured to extend into the lamp body through the wire inlet base to be connected to the male terminal. A first waterproof sealing ring is arranged between the wire inlet base and the electrical wire, a locking nut is disposed around the electrical wire, and the locking nut is configured to be fixedly connected to the wire inlet base to lock the first waterproof sealing ring in the wire inlet base.

10 Claims, 6 Drawing Sheets

WATERPROOF LAMP

TECHNICAL FIELD

The present disclosure relates to the technical field of lamps, in particular to a waterproof lamp.

BACKGROUND

In life, lamps are widely applied to various fields to provide lighting, decoration and other functions and can create different atmospheres and visual effects. Because of the diversity of the service environments of lamps, to satisfy the usage requirements in different environments, the waterproof sealing design of lamps must be taken into consideration when most lamps are manufactured, to avoid lamp failures caused by water entering the lamps. Particularly for lamps applied to swimming pools or bathrooms, the waterproof sealing design is especially important.

However, the waterproof sealing structure of some existing lamps is complex; because the connecting wire port of such lamps is exposed to the outside, in order to provide waterproof sealing of the lamps, one waterproof sealing design is necessary for a wire inlet for a connecting wire of the lamps, and another waterproof sealing design is necessary for the joint of the connecting wire port of the lamps and an external electrical wire. The multiple waterproof sealing designs of the lamps not only increase the structural complexity and installation complexity of the lamps, but also increase the manufacturing cost of the lamps. Therefore, there is a need for a lamp which has a simple structure and good waterproofness.

SUMMARY

The present disclosure is directed to a waterproof lamp which has a simple structure and good waterproofness.

In various embodiments, a waterproof lamp is provided which may include a lamp body, a wire inlet base arranged at a bottom of the lamp body, and an electrical wire. A PCB and a lamp panel electrically connected to the PCB are arranged in the lamp body, a male terminal is arranged on the PCB, a female terminal is correspondingly arranged at an end of the electrical wire, and the female terminal is configured to extend into the lamp body through the wire inlet base to be connected to the male terminal. A first waterproof sealing ring is arranged between the wire inlet base and the electrical wire, a locking nut is disposed around the electrical wire, and the locking nut is configured to be fixedly connected to the wire inlet base to lock the first waterproof sealing ring in the wire inlet base.

In some embodiments, a receiving cavity is formed in the wire inlet base, a wire inlet is formed in an end surface of a side, close to the lamp body, of the receiving cavity, the receiving cavity is in communication with to an inside of the lamp body by means of the wire inlet, an outer diameter of the female terminal is less than or equal to an inner diameter of the wire inlet, and the female terminal is configured to extend into the lamp body via the wire inlet to be connected to the male terminal.

In some embodiments, the receiving cavity comprises a first cavity and a second cavity which are sequentially arranged in a direction away from the lamp body, the first cavity and the second cavity are arranged coaxially and connected, a cross-sectional area of the first cavity is less than a cross-sectional area of the second cavity, the wire inlet is formed in an end surface of a side, close to the lamp body, of the first cavity, the female terminal is configured to be mounted in the first cavity, and the first waterproof sealing ring is configured to be mounted in the second cavity.

In some embodiments, the second cavity is a funnel-shaped cavity and comprises a first end close to the first cavity and a second end away from the first cavity, a diameter of the first end is less than a diameter of the second end, and the first waterproof sealing ring is a frustum-shaped sealing ring matched with the funnel-shaped cavity.

In some embodiments, the female terminal comprises a terminal head and a terminal body which are detachably connected, an outer diameter of the terminal head is less than an inner diameter of the wire inlet, an outer diameter of the terminal body is greater than the inner diameter of the wire inlet, the terminal body is configured to be abutted against an inner side of the end surface of the side, close to the lamp body, of the receiving cavity, and the first waterproof sealing ring is disposed around the electrical wire and is configured to be abutted against the terminal body.

In some embodiments, an outer diameter of the first waterproof sealing ring is greater than or equal to the outer diameter of the terminal body, and an inner diameter of the first waterproof sealing ring is less than the outer diameter of the terminal head.

In some embodiments, at least one limiting groove is formed in an outer side of the terminal body in an axial direction, and a limiting bump matched with the limiting groove is arranged on an inner surface of the receiving cavity.

In some embodiments, the lamp body comprises a lamp holder and a lamp shade mounted on the lamp holder, the PCB and the lamp panel are located in the lamp holder, and a plurality of LED beads is arranged on the lamp panel.

In some embodiments, a first groove is formed in a contact surface between the lamp holder and the lamp shade in a circumferential direction, a second groove is formed in the contact surface on an inner side of the first groove, and the second groove is arranged along a circumferential direction of the inner side of the first groove; and a protrusion matched with the first groove is arranged on a side, close to the lamp holder, of the lamp shade, the protrusion is clamped and fixed in the first groove, and a second waterproof sealing ring is arranged in the second groove.

In some embodiments, a waterproof gasket is disposed around the wire inlet base, and two ends of the waterproof gasket are configured to be abutted against the lamp body and the locking nut, respectively.

The present disclosure has the following beneficial effects: the male terminal on the PCB is arranged in the lamp body, and the female terminal connected to the electrical wire is configured to extend into the lamp body through the wire inlet base to be connected to the male terminal, such that waterproof treatment is not needed for the area where the female terminal and the male terminal are plug-connected together, thus reducing the need for sealing parts, and simplifying the structure of the lamp, which is conducive to reducing the production cost and installation difficulty of the lamp. In addition, in order to realize waterproof sealing of the PCB, the lamp panel, the male terminal and the female terminal in the lamp body, only the first waterproof sealing ring is needed to be arranged in the wire inlet base to realize waterproof sealing of the wire inlet. Moreover, the first waterproof sealing ring is firmly locked in the wire inlet base by means of the locking nut, which prevents the first waterproof sealing ring against contact with liquids and moisture in the outside, thus ensuring normal operation of the lamp in humid or wet environments and improving the waterproof sealing effect of the lamp.

REFERENCE NUMERALS

1, lamp body; 11, lamp holder; 12, lamp shade; 13, first groove; 14, second groove; 15, protrusion; 2, wire inlet base; 21, external thread; 22, receiving cavity; 221, first cavity; 222, second cavity; 223, limiting bump; 23, wire inlet; 3, electrical wire; 4, PCB; 41, positioning screw; 5, lamp panel; 51, positioning post; 52, LED bead; 6, male terminal; 7, female terminal; 71, terminal head; 72, terminal body; 721, limiting groove; 8, first waterproof sealing ring; 9, locking nut; 10, second waterproof sealing ring.

DESCRIPTION OF THE EMBODIMENTS

To allow those skilled in the art to have a better understanding of the technical solution of the present disclosure, the present disclosure is described in further detail below in conjunction with accompanying drawings. The embodiments in the following description are merely illustrative ones, and are not all possible ones of the present disclosure. All other embodiments obtained by those ordinarily skilled in the art based on the following ones without creative labor should also fall within the protection scope of the present disclosure.

Figure 1:
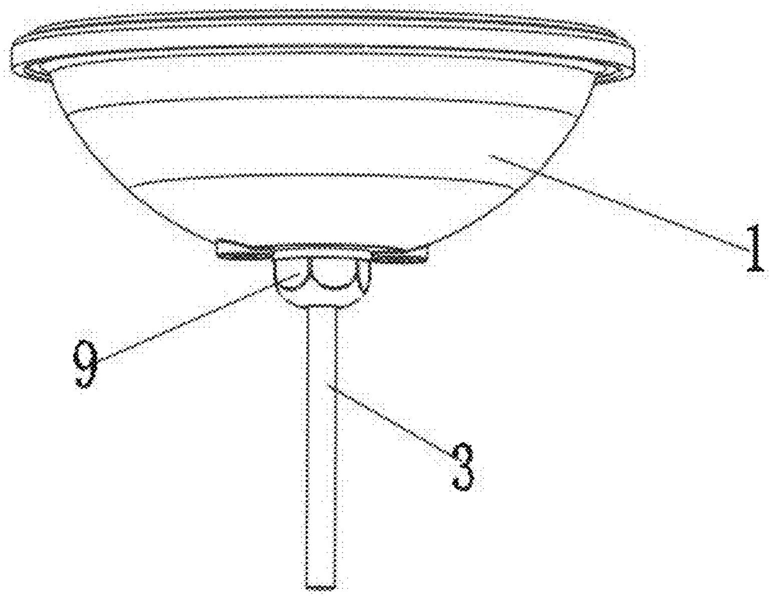
FIG. 1 illustrates a waterproof lamp according to one embodiment of the present disclosure.

FIG. 1 shows a waterproof lamp which can be used for lighting in water-related environments such as bathtubs and swimming pools. The waterproof lamp comprises a lamp body 1, a wire inlet base 2 arranged at a bottom of the lamp body 1, and an electrical wire 3. In this embodiment, the wire inlet base 2 and the lamp body 1 are formed integrally.

Figure 2:
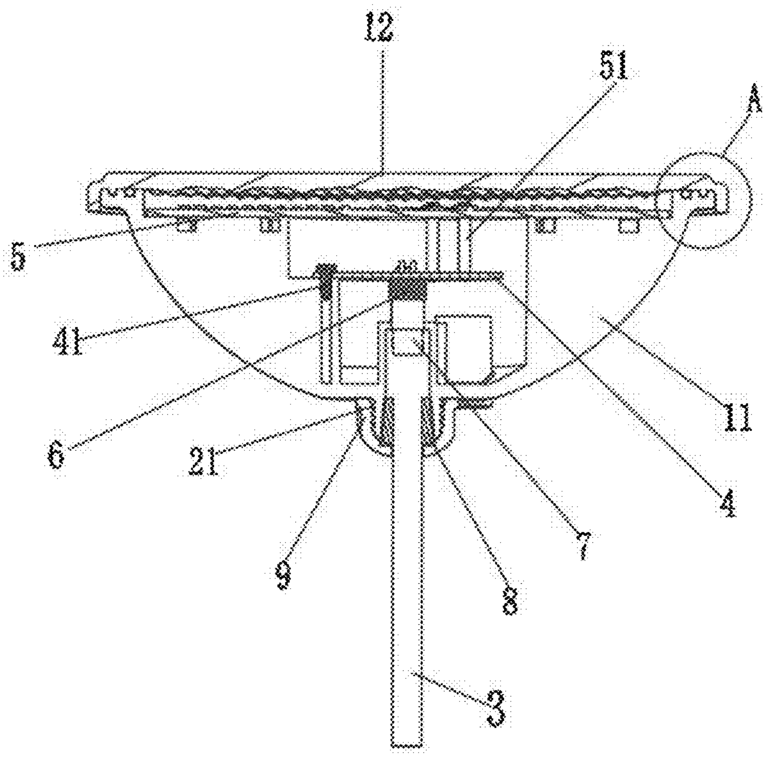
FIG. 2 is a sectional view of the waterproof lamp according to one embodiment of the present disclosure.
Figure 4:
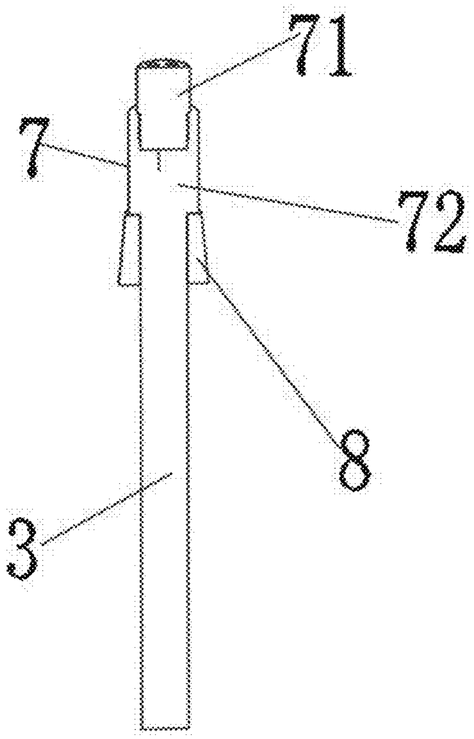
FIG. 4 is a sectional view of an electrical wire, a female terminal and a first waterproof sealing ring in use according to one embodiment of the present disclosure.

Specifically, referring to FIGS. 2 and 4, a printed circuit board (PCB) 4 and a lamp panel 5 electrically connected to the PCB 4 are arranged in the lamp body 1, and a plurality of LED beads 52 is arranged on the lamp panel 5. In this embodiment, the LED beads 52 are arranged for example, but not limited to, in any of a circular and a linear arrangement. A male terminal 6 is arranged on the PCB 4, a female terminal 7 is correspondingly arranged at one end of the electrical wire 3, and the female terminal 7 selectively extends into the lamp body 1 through the wire inlet base 2 to be connected to the male terminal 6. The electrical wire 3 is connected to the male terminal 6 on the PCB 4 by means of the female terminal 7 at the end of the electrical wire 3 to form a complete circuit. When the male terminal 6 and the female terminal 7 are connected, power from a power supply is finally transmitted to the PCB 4 through the electrical wire 3, the female terminal 7 and the male terminal 6; the PCB 4 receives the power from the power supply, and transmits a control signal to the lamp panel 5 through the circuit according to a preset circuit logic, so as to drive the LED beads 52 to emit light to fulfil a lighting function. Moreover, the male terminal 6 is arranged in the lamp body 1, and the female terminal 7 connected to the electrical wire 3 extends into the lamp body 1 through the wire inlet base 2 to be connected to the male terminal 6, such that waterproof treatment is not needed for the area where the female terminal 7 and the male terminal 6 are plug-connected together, thus reducing the need for sealing parts, simplifying the structure of the lamp, and reducing the production cost of the lamp.

A first waterproof sealing ring 8 is arranged between the wire inlet base 2 and the electrical wire 3, a locking nut 9 is disposed around the electrical wire 3, and the locking nut 9 is configured to be fixedly connected to the wire inlet base 2 to lock the first waterproof sealing ring 8 in the wire inlet base 2. Specifically, an external thread 21 is arranged on an outer surface of the wire inlet base 2, an internal thread (not shown) matched with the external thread 21 is arranged on an inner surface of the locking nut 9, and the inner surface of the locking nut 9 can be threadedly connected to the outer surface of the wire inlet base 2 to lock the first waterproof sealing ring 8 in the wire inlet base 2.

With the first waterproof sealing ring 8 arranged between the wire inlet base 2 and the electrical wire 3, and the locking nut 9 fixedly connected to the wire inlet base 2 to firmly lock the first waterproof sealing ring 8 in the wire inlet base 2, moisture, humid air and other liquids can be prevented from entering the lamp body 1 through the wire inlet base 2, thereby realizing waterproof scaling of the PCB 4, the lamp panel 5, the male terminal 6 and the female terminal 7, and preventing the first waterproof sealing 8 against contact with liquids and moisture in the outside, thus improving the waterproof sealing effect of the lamp.

A receiving cavity 22 is formed in the wire inlet base 2, and a wire inlet 23 is formed in an end surface of a side, close to the lamp body 1, of the receiving cavity 22. The receiving cavity 22 is in communication with the inside of the lamp body 1 through the wire inlet 23, an outer diameter of the female terminal 7 is less than or equal to the inner diameter of the wire inlet 23, and the female terminal 7 is configured to extend into the lamp body 1 via the wire inlet 23 to be connected to the male terminal 6 to form a complete circuit. It should be noted that a cross section of the wire inlet 23 is not necessarily circular in shape, and the term "inner diameter" used herein for the wire inlet 23 should be construed to mean a size of an inner space of the wire inlet 23 in a direction perpendicular to the direction in which the female terminal 7 extends through the wire inlet 23.

The receiving cavity 22 comprises a first cavity 221 and a second cavity 222 which are sequentially arranged in a direction away from the lamp body 1, the first cavity 221 and the second cavity 222 are arranged coaxially and connected, a cross-sectional area of the first cavity 221 is less than that of the second cavity 222, the wire inlet 23 is formed in an end surface of a side, close to the lamp body 1, of the first cavity 221, the female terminal 7 is configured to be mounted in the first cavity 221, and the first waterproof sealing ring 8 is configured to be mounted in the second cavity 222. The second cavity 222 is a hollow funnel-shaped cavity and comprises a first end close to the first cavity 221 and a second end away from the first cavity 221, the diameter of the first end is less than that of the second end, and the first waterproof sealing ring 8 is a frustum-shaped sealing ring matched with the funnel-shaped cavity. In use, an outer surface of the frustum-shaped sealing ring may be in close fit with an inner surface of the funnel-shaped cavity to improve the waterproof sealing effect.

Figure 5:
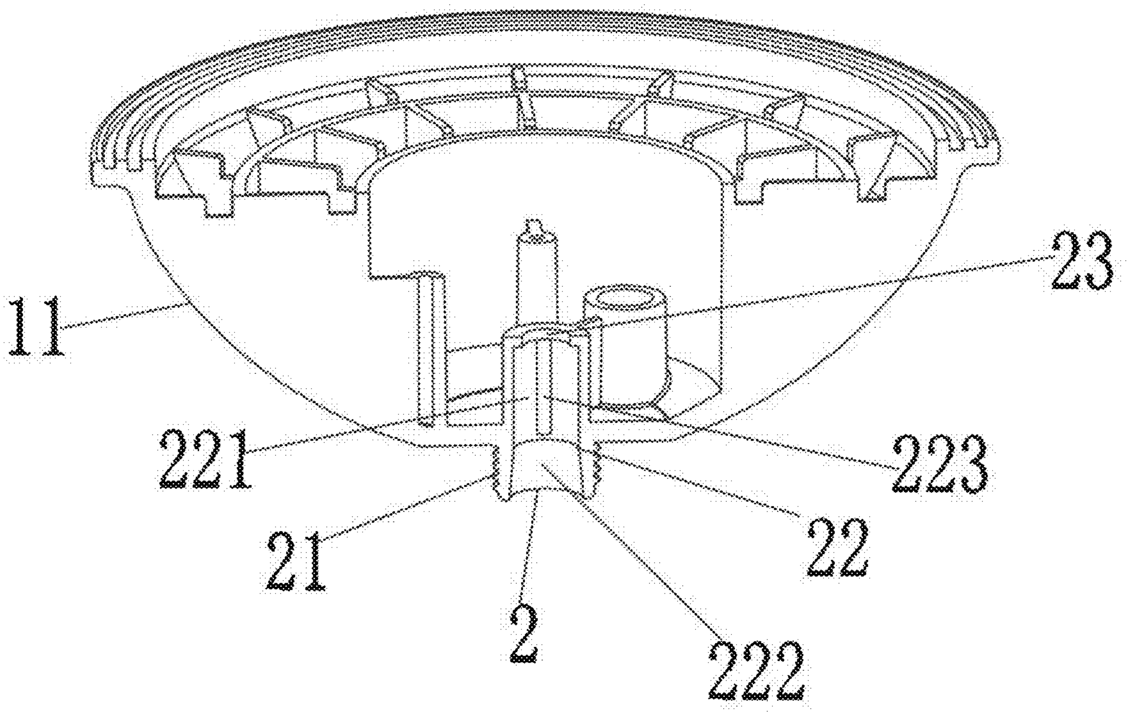
FIG. 5 is a sectional view of a lamp holder and a wire inlet base according to one embodiment of the present disclosure.
Figure 6:
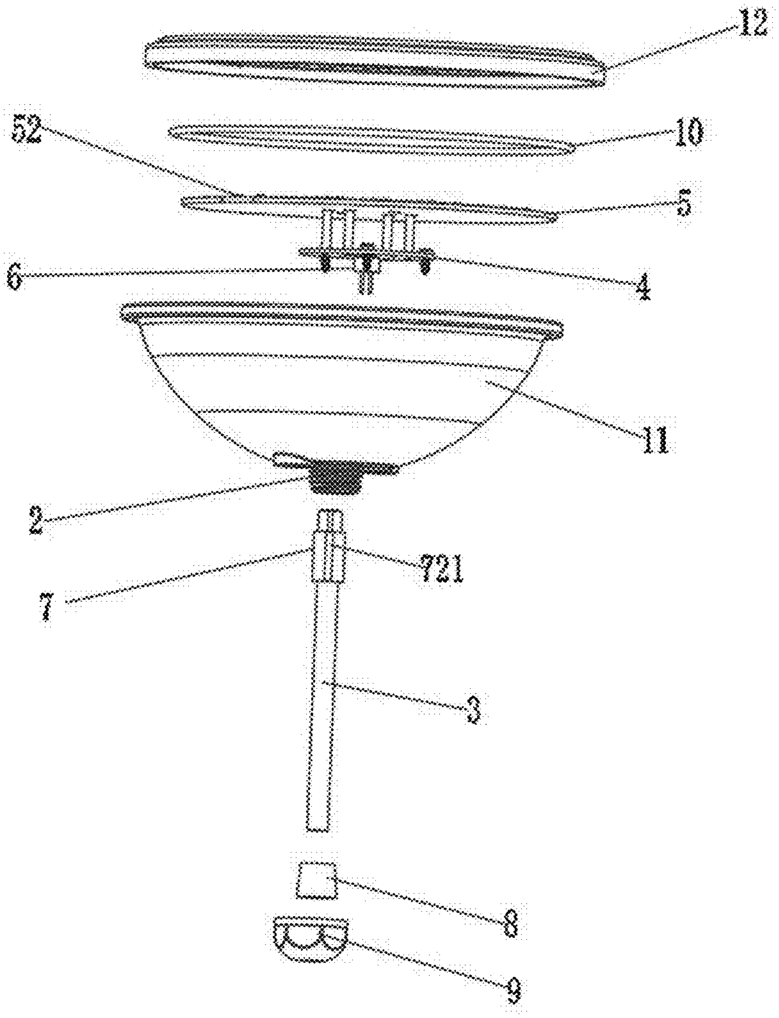
FIG. 6 is an exploded view of the waterproof lamp according to one embodiment of the present disclosure.

Referring also to FIG. 5 and FIG. 6, preferably, at least one limiting groove 721 extending in an axial direction is formed in an outer side of a terminal body 72, and a limiting bump 223 matched with the limiting groove 721 is arranged on an inner surface of the receiving cavity 22. The limiting groove 721 is configured to be slidably connected to the limiting bump 223 in the axial direction. By means of the design of slidable connection between the limiting groove 721 and the limiting bump 223, the terminal body 72 can be accurately positioned in the connection process and thus can be operated more easily, and the terminal body 72 can be slidably connected to the receiving cavity 22 stably. In this embodiment, there is one limiting groove 721 formed in the outer side of the terminal body 72 in the axial direction, and the limiting bump 223 is arranged on the inner surface of the first cavity 221.

The female terminal 7 comprises a terminal head 71 and the terminal body 72 which are detachably connected. An outer diameter of the terminal head 71 is less than the inner diameter of the wire inlet 23, an outer diameter of the terminal body 72 is greater than the inner diameter of the wire inlet 23, the terminal body 72 is configured to be abutted against an inner side of the end surface of the side, close to the lamp body 1, of the receiving cavity 22, the first waterproof scaling ring 8 is disposed around the electrical wire 3 and is configured to be abutted against the terminal body 72. The terminal head 71 and the terminal body 72 are connected by for example, but not limited to, a thread connection or a snap connection. In this embodiment, the terminal head 71 is threaded onto the terminal body 72.

Preferably, the outer diameter of the first waterproof sealing ring 8 is greater than or equal to that of the terminal body 72, and the inner diameter of the first waterproof scaling ring 8 is less than the outer diameter of the terminal head 71. Because the outer diameter of the terminal head 71 is less than the inner diameter of the wire inlet 23 and the outer diameter of the terminal body 72 is greater than the inner diameter of the wire inlet 23, when the female terminal 7 extends into the wire inlet 23, the terminal head 71 of the female terminal 72 extends into the wire inlet 23 to be connected to the male terminal 6, one end of the terminal body 72 gradually approaches the end surface of the side, close to the lamp body 1, of the receiving cavity 22 until it is abutted against the inner side of the end surface, so as to cooperate with first waterproof sealing ring 8 to achieve a good waterproof sealing effect of the wire inlet 23.

Preferably, a waterproof gasket (not shown) is further disposed around the wire inlet base 2, and two ends of the waterproof gasket are configured to be abutted against the lamp body 1 and the locking nut 9, respectively. The waterproof gasket is used for preventing liquids and moisture in the outside from entering the wire inlet base 2 via the contact surface between the locking nut 9 and the wire inlet base 2, thus further improving the sealing effect of the lamp.

In this embodiment, the waterproof lamp is assembled as follows: the electrical wire 3 extends into the lamp body 1 via the wire inlet 23 of the wire inlet base 2 to enable the limiting groove 721 in the outer side of the terminal body 72 of the female terminal 7 to be slidably connected to the limiting bump 223 of the receiving cavity 22 in the axial direction so as to allow the end, connected to the terminal head 71, of the terminal body 72 to be abutted against the end surface of the first cavity 221, and at this moment, the terminal head 71 of the female terminal 7 is connected to the male terminal 6. Then, the first waterproof sealing ring 8 is disposed around the electrical wire 3 and is slid towards the female terminal 7 to allow the first waterproof sealing ring 8 to enter the second cavity 222 and to be abutted against the terminal body 72 to form a tight waterproof barrier. Finally, the waterproof gasket is disposed around the wire inlet base 2, and the locking nut 9 is threadedly connected to the outer surface of the wire inlet base 2 to lock the first waterproof sealing ring 8 in the second cavity 222. At the same time, the two ends of the waterproof gasket are brought to be abutted against the lamp body 1 and the locking nut 9, respectively, thus completing the assembly of the waterproof lamp.

Referring to FIGS. 4 and 6, the lamp body 1 comprises a lamp holder 11 and a lamp shade 12 mounted on the lamp holder 11, and the PCB 4 and the lamp panel 5 are located in the lamp holder 11. In this embodiment, the lamp shade 12 is made from a light-transmitting material or a transparent material.

Figure 3:
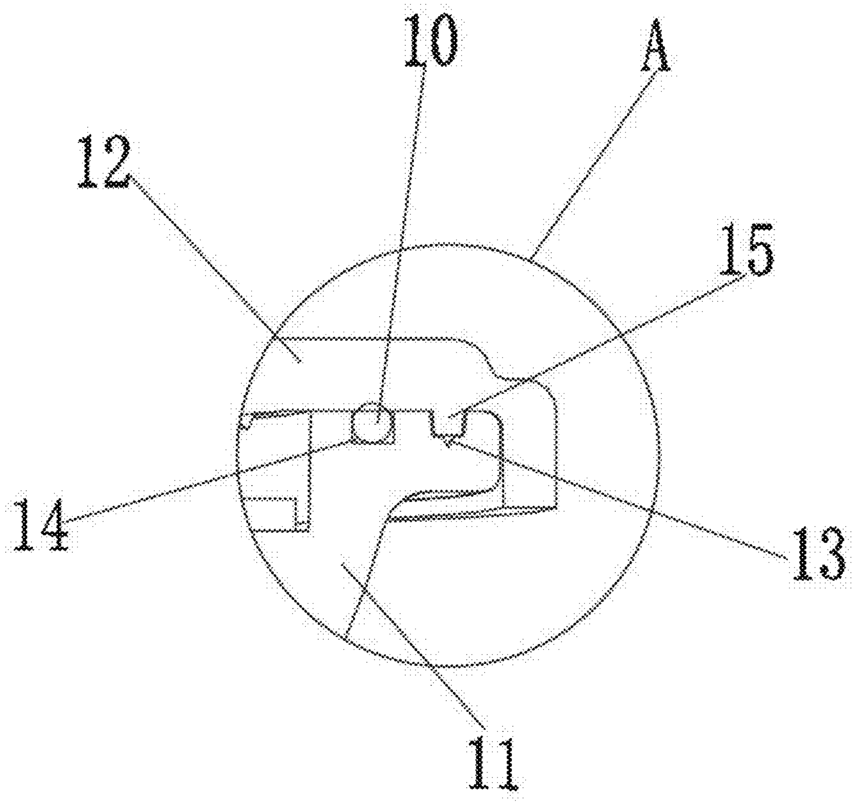
FIG. 3 is an enlarged view of part A in FIG. 2.

Referring to FIGS. 2 and 3, a first groove 13 is formed in a contact surface between the lamp holder 11 and the lamp shade 12 in a circumferential direction, a second groove 14 is formed in the contact surface on an inner side of the first groove 13, and the second groove 14 is arranged along a circumferential direction of the inner side of the first groove 13 in; and a protrusion 15 matched with the first groove 13 is arranged on a side, close to the lamp holder 11, of the lamp shade 12, the protrusion 15 is clamped and fixed in the first groove 13, and a second waterproof sealing ring 10 is arranged in the second groove 14. The second waterproof sealing ring 10 is a circular sealing ring with a circular cross-section.

The second waterproof sealing ring 10 arranged in the second groove 14 can prevent moisture, humid air and other liquids from entering the lamp body 1 via a gap in a connection area between the lamp holder 11 and the lamp shade 12, such that the sealing performance of the lamp is further improved, fulfilling a better waterproof effect of the lamp.

In this embodiment, the contact surface between the lamp holder 11 and the lamp shade 12 is an ultrasonic welded surface. After the protrusion 15 of the lamp shade 12 is clamped and fixed in the first groove 13 of the lamp holder 11, ultrasonic welding is carried out to perform local heating and surface cleaning on the protrusion 15 and the first groove 13 by means of high-frequency oscillations of ultrasonic waves, and then a pressure is applied to weld together the lamp holder 11 and the lamp shade 12.

Multiple positioning holes (not shown) are formed in the PCB 4, multiple positioning posts 51 are correspondingly arranged on the lamp panel 5, and each positioning hole and the corresponding positioning post 51 are detachably connected by means of a positioning screw 41, thereby realizing the detachable connection between the lamp panel 5 and the PCB 4.

According to the waterproof lamp provided by this embodiment, the waterproof for the whole lamp can be realized by only one waterproof design for the interior of the wire inlet base 2, and the waterproof lamp is simple in structure, easy to mount, low in manufacturing cost, and good in waterproofness.

The above are only some preferred embodiments of this disclosure, and should not be construed to limit the protection scope of this disclosure. Any modifications, equivalent replacements and improvements made within the principles of the present disclosure should be included within the protection scope of the present disclosure.

What is claimed is:

1. A waterproof lamp, comprising a lamp body, a wire inlet base arranged at a bottom of the lamp body and an electrical wire, wherein a PCB and a lamp panel electrically connected to the PCB are arranged in the lamp body, a male terminal is arranged on the PCB, a female terminal is correspondingly arranged at an end of the electrical wire, and the female terminal is configured to extend into the lamp body through the wire inlet base to be connected to the male terminal; a first waterproof sealing ring is arranged between the wire inlet base and the electrical wire, a locking nut is disposed around the electrical wire, and the locking nut is configured to be fixedly connected to the wire inlet base to lock the first waterproof sealing ring in the wire inlet base;

wherein the lamp body comprises a lamp holder and a lamp shade mounted on the lamp holder, the PCB and the lamp panel are located in the lamp holder, and a plurality of LED beads is arranged on the lamp panel; and wherein a first groove is formed in a contact surface between the lamp holder and the lamp shade in a circumferential direction, a second groove is formed in the contact surface on an inner side of the first groove, and the second groove is arranged along a circumferential direction of the inner side of the first groove; and a protrusion matched with the first groove is arranged on a side, close to the lamp holder, of the lamp shade, the protrusion is clamped and fixed in the first groove, and a second waterproof sealing ring is arranged in the second groove.

2. The waterproof lamp according to claim 1, wherein a receiving cavity is formed in the wire inlet base, a wire inlet is formed in an end surface of a side, close to the lamp body, of the receiving cavity, the receiving cavity is in communication with to an inside of the lamp body by means of the wire inlet, an outer diameter of the female terminal is less than or equal to an inner diameter of the wire inlet, and the female terminal is configured to extend into the lamp body via the wire inlet to be connected to the male terminal.

3. The waterproof lamp according to claim 2, wherein the receiving cavity comprises a first cavity and a second cavity which are sequentially arranged in a direction away from the lamp body, the first cavity and the second cavity are arranged coaxially and connected, a cross-sectional area of the first cavity is less than a cross-sectional area of the second cavity, the wire inlet is formed in an end surface of a side, close to the lamp body, of the first cavity, the female terminal is configured to be mounted in the first cavity, and the first waterproof sealing ring is configured to be mounted in the second cavity.

4. The waterproof lamp according to claim 3, wherein the second cavity is a funnel-shaped cavity and comprises a first end close to the first cavity and a second end away from the first cavity, a diameter of the first end is less than a diameter of the second end, and the first waterproof scaling ring is a frustum-shaped sealing ring matched with the funnel-shaped cavity.

5. The waterproof lamp according to claim 2, wherein the female terminal comprises a terminal head and a terminal body which are detachably connected, an outer diameter of the terminal head is less than an inner diameter of the wire inlet, an outer diameter of the terminal body is greater than the inner diameter of the wire inlet, the terminal body is configured to be abutted against an inner side of the end surface of the side, close to the lamp body, of the receiving cavity, and the first waterproof sealing ring is disposed around the electrical wire and is configured to be abutted against the terminal body.

6. The waterproof lamp according to claim 5, wherein an outer diameter of the first waterproof sealing ring is greater than or equal to the outer diameter of the terminal body, and an inner diameter of the first waterproof sealing ring is less than the outer diameter of the terminal head.

7. The waterproof lamp according to claim 5, wherein at least one limiting groove is formed in an outer side of the terminal body in an axial direction, and a limiting bump matched with the limiting groove is arranged on an inner surface of the receiving cavity.

8. The waterproof lamp according to claim 1, wherein a waterproof gasket is disposed around the wire inlet base, and two ends of the waterproof gasket are configured to be abutted against the lamp body and the locking nut, respectively.

9. A waterproof lamp, comprising a lamp body, a wire inlet base arranged at a bottom of the lamp body and an electrical wire, wherein a PCB and a lamp panel electrically connected to the PCB are arranged in the lamp body, a male terminal is arranged on the PCB, a female terminal is correspondingly arranged at an end of the electrical wire, and the female terminal is configured to extend into the lamp body through the wire inlet base to be connected to the male terminal; a first waterproof sealing ring is arranged between the wire inlet base and the electrical wire, a locking nut is disposed around the electrical wire, and the locking nut is configured to be fixedly connected to the wire inlet base to lock the first waterproof sealing ring in the wire inlet base;

wherein a receiving cavity is formed in the wire inlet base, a wire inlet is formed in an end surface of a side, close to the lamp body, of the receiving cavity, the receiving cavity is in communication with to an inside of the lamp body by means of the wire inlet, an outer diameter of the female terminal is less than or equal to an inner diameter of the wire inlet, and the female terminal is configured to extend into the lamp body via the wire inlet to be connected to the male terminal;

wherein the receiving cavity comprises a first cavity and a second cavity which are sequentially arranged in a direction away from the lamp body, the first cavity and the second cavity are arranged coaxially and connected, a cross-sectional area of the first cavity is less than a cross-sectional area of the second cavity, the wire inlet is formed in an end surface of a side, close to the lamp body, of the first cavity, the female terminal is configured to be mounted in the first cavity, and the first waterproof sealing ring is configured to be mounted in the second cavity; and wherein the second cavity is a funnel-shaped cavity and comprises a first end close to the first cavity and a second end away from the first cavity, a diameter of the first end is less than a diameter of the second end, and the first waterproof sealing ring is a frustum-shaped sealing ring matched with the funnel-shaped cavity.

10. A waterproof lamp, comprising a lamp body, a wire inlet base arranged at a bottom of the lamp body and an electrical wire, wherein a PCB and a lamp panel electrically connected to the PCB are arranged in the lamp body, a male terminal is arranged on the PCB, a female terminal is correspondingly arranged at an end of the electrical wire, and the female terminal is configured to extend into the lamp body through the wire inlet base to be connected to the male terminal; a first waterproof sealing ring is arranged between the wire inlet base and the electrical wire, a locking nut is disposed around the electrical wire, and the locking nut is configured to be fixedly connected to the wire inlet base to lock the first waterproof sealing ring in the wire inlet base;

wherein a receiving cavity is formed in the wire inlet base, a wire inlet is formed in an end surface of a side, close to the lamp body, of the receiving cavity, the receiving cavity is in communication with to an inside of the lamp body by means of the wire inlet, an outer diameter of the female terminal is less than or equal to an inner diameter of the wire inlet, and the female terminal is configured to extend into the lamp body via the wire inlet to be connected to the male terminal;

wherein the female terminal comprises a terminal head and a terminal body which are detachably connected, an outer diameter of the terminal head is less than an inner diameter of the wire inlet, an outer diameter of the terminal body is greater than the inner diameter of the wire inlet, the terminal body is configured to be abutted against an inner side of the end surface of the side, close to the lamp body, of the receiving cavity, and the first waterproof sealing ring is disposed around the electrical wire and is configured to be abutted against the terminal body; and wherein an outer diameter of the first waterproof sealing ring is greater than or equal to the outer diameter of the terminal body, and an inner diameter of the first waterproof sealing ring is less than the outer diameter of the terminal head.

* * * * *